(12) United States Patent
Carter et al.

(10) Patent No.: US 9,720,999 B2
(45) Date of Patent: *Aug. 1, 2017

(54) META-DIRECTORY CONTROL AND EVALUATION OF EVENTS

(71) Applicant: Micro Focus Software Inc., Provo, UT (US)

(72) Inventors: Stephen R Carter, Spanish Fork, UT (US); Scott A. Isaacson, Woodland Hills, UT (US)

(73) Assignee: Micro Focus Software Inc., Provo, UT (US)

(*) Notice: Subject to any disclaimer, the term of this patent is extended or adjusted under 35 U.S.C. 154(b) by 7 days.

This patent is subject to a terminal disclaimer.

(21) Appl. No.: 14/753,901

(22) Filed: Jun. 29, 2015

(65) Prior Publication Data
US 2015/0302077 A1    Oct. 22, 2015

Related U.S. Application Data

(63) Continuation of application No. 13/864,840, filed on Apr. 17, 2013, now Pat. No. 9,104,706, which is a continuation of application No. 13/016,151, filed on Jan. 28, 2011, now Pat. No. 8,495,426.

(51) Int. Cl.
| | |
|---|---|
| *G06F 11/00* | (2006.01) |
| *G06F 17/30* | (2006.01) |
| *G06F 11/30* | (2006.01) |

(52) U.S. Cl.
CPC .... *G06F 17/30598* (2013.01); *G06F 11/3006* (2013.01); *G06F 11/3072* (2013.01); *G06F 17/30289* (2013.01); *G06F 17/30539* (2013.01); *G06F 17/30943* (2013.01)

(58) Field of Classification Search
CPC .................................................. G06F 11/3072
USPC ............ 714/28, 38.1, 39; 719/318; 707/737
See application file for complete search history.

(56) References Cited

U.S. PATENT DOCUMENTS

| | | | |
|---|---|---|---|
| 6,154,849 A | 11/2000 | Xia | |
| 6,925,431 B1 * | 8/2005 | Papaefstathiou ... | G06F 17/5022 703/17 |
| 7,028,229 B2 | 4/2006 | McGuire et al. | |
| 7,653,723 B2 | 1/2010 | Tanaka et al. | |
| 7,734,689 B2 | 6/2010 | Richer et al. | |
| 7,752,228 B2 | 7/2010 | Rapp | |
| 7,779,421 B2 | 8/2010 | Kasravi et al. | |

(Continued)

OTHER PUBLICATIONS

U.S. Appl. No. 13/864,840, filed Apr. 17, 2013, Meta-Directory Control and Evaluation of Events.

*Primary Examiner* — Dieu-Minh Le

(74) *Attorney, Agent, or Firm* — Schwegman Lundberg & Woessner, P.A.

(57) ABSTRACT

Techniques for meta-directory control and evaluation of events are provided. Disparate events from heterogeneous processing environments are collected as the events are produced by resources within the processing environments. The events are filtered and organized into taxonomies. Next the filtered and organized events are assigned to nodes of a Meta directory, each node defining a relationship between two or more of the resources and policy is applied. Finally, additional policy is evaluated in view of the events and their node assignments with other events, and one or more automated actions are then taken.

20 Claims, 4 Drawing Sheets

(56) References Cited

U.S. PATENT DOCUMENTS

| | | |
|---|---|---|
| 7,835,933 B2 | 11/2010 | Casati et al. |
| 7,840,284 B2 | 11/2010 | Kondo et al. |
| 7,870,167 B2 | 1/2011 | Lu et al. |
| 8,495,426 B2 * | 7/2013 | Carter ................ G06F 11/3006 714/26 |
| 9,104,706 B2 * | 8/2015 | Carter ................ G06F 11/3006 |
| 2004/0030537 A1 * | 2/2004 | Barnard ................ H04L 41/06 702/194 |
| 2008/0155564 A1 | 6/2008 | Shcherbina et al. |
| 2009/0019456 A1 | 1/2009 | Saxena et al. |
| 2009/0172149 A1 | 7/2009 | Bobak et al. |
| 2009/0172689 A1 | 7/2009 | Bobak et al. |
| 2009/0327169 A1 * | 12/2009 | Kamar ................ G06Q 10/109 706/11 |
| 2011/0045803 A1 | 2/2011 | Kim et al. |
| 2011/0231862 A1 | 9/2011 | Walsh |
| 2012/0158783 A1 | 6/2012 | Nice et al. |
| 2012/0198282 A1 | 8/2012 | Carter et al. |
| 2013/0232127 A1 | 9/2013 | Carter et al. |

* cited by examiner

META-DIRECTORY CONTROL AND EVALUATION OF EVENTS

This application is a continuation of U.S. patent application Ser. No. 13/864,840, filed on Apr. 17, 2013, which is a continuation of U.S. patent application Ser. No. 13/016,151, filed on Jan. 28, 2011, now issued as U.S. Pat. No. 8,495,426, each of which is incorporated herein by reference in its entirety.

BACKGROUND

Enterprises are finding it increasingly difficult to stay abreast with the rapidly evolving technology platforms. That is, software and hardware upgrades are commonplace for an information technology (IT) infrastructure of an enterprise and maintaining a state of the art infrastructure is costly, time consuming, and distracts from the business of an enterprise. But, there is no avoiding technology and the enterprise's business is intimately dependent on its underlying infrastructure. So, an enterprise is in a catch-22 position and is forced to maintain a costly IT infrastructure.

One thing is for certain, the amount and types of devices supported by an enterprise are ever expanding and along with this situation are a myriad of metrics and log information that the enterprise knows is useful but struggles to intelligently leverage and use.

Similar to Moore's Law, the proliferation of hardware devices and software services increases the amount of diagnostic information in log files and as events each year. Even with the consolidation of multiple, special purpose devices into smart phones and netbook computers, there are more and more of those devices, along with physical and virtual appliances and the hosts that run them and support them. An enterprise is challenged to understand how to manage all of the new information that comes from these devices and their relationships and how each event and log record relates to each other and to other aspects of a data center.

For example, it may be very obscure that a power fluctuation caused a fault to occur in a router resulting in the failure of a single record update in the enterprise product catalog. Without an understanding of the sequence of events, a lot of time may be wasted trying to evaluate the update failure or router port failure when actually the problem rests with the power conditioning equipment for one segment of the power distribution system within the data center.

SUMMARY

In various embodiments, techniques for meta-directory control and evaluation of events are presented. More specifically, and in an embodiment, a method for meta-directory control and evaluation of events is provided.

Specifically, events are collected from resources processing in heterogeneous environments. The events are organized into one or more taxonomies. Then, particular events are assigned to nodes defined in a directory; each node representing a relationship between two or more of the resources. Finally, the particular events are evaluated in view of other events for the nodes of the directory.

DETAILED DESCRIPTION

Figure 1:
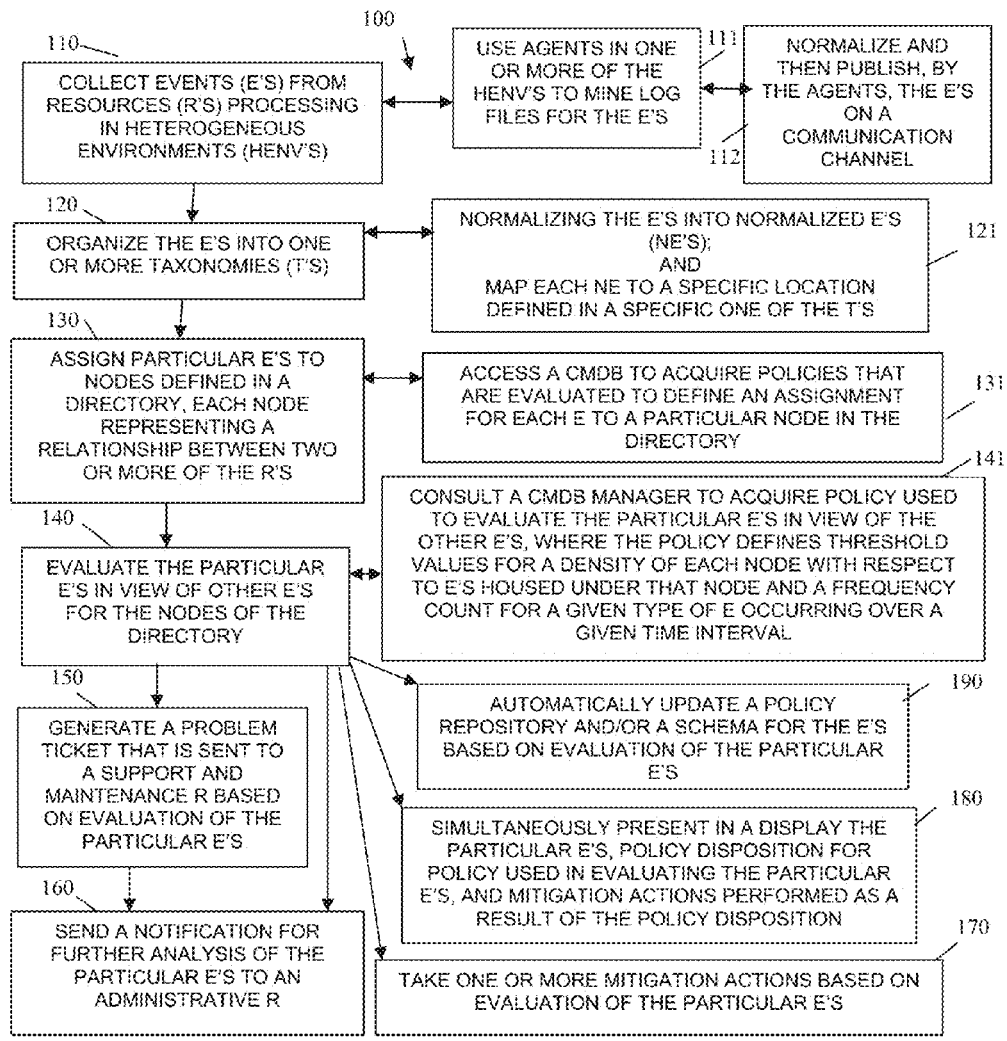
FIG. 1 is a diagram of a method for meta-directory control and evaluation of events, according to an example embodiment.

A "resource" includes a user, service, system, device, directory, data store, groups of users, combinations of these things, etc. A "principal" is a specific type of resource, such as an automated service or user that acquires an identity. A designation as to what is a resource and what is a principal can change depending upon the context of any given network transaction. Thus, if one resource attempts to access another resource, the actor of the transaction may be viewed as a principal.

An "identity" is something that is formulated from one or more identifiers and secrets that provide a statement of roles and/or permissions that the identity has in relation to resources. An "identifier" is information, which may be private and permits an identity to be formed, and some portions of an identifier may be public information, such as a user identifier, name, etc. Some examples of identifiers include social security number (SSN), user identifier and password pair, account number, retina scan, fingerprint, face scan, etc.

A "processing environment" defines a set of cooperating computing resources, such as machines, storage, software libraries, software systems, etc. that form a logical computing infrastructure. A "logical computing infrastructure" means that computing resources can be geographically distributed across a network, such as the Internet. So, one computing resource at network site X and be logically combined with another computing resource at network site Y to form a logical processing environment.

The phrases "processing environment," "cloud processing environment," and the term "cloud" may be used interchangeably and synonymously herein.

Moreover, it is noted that a "cloud" refers to a logical and/or physical processing environment as discussed above.

The phrase "cloud network" refers to a network of cloud processing environments logically being managed as a single collective network.

An "event" refers to data or information produced or caused to be produced by a resource (hardware and/or software). In some cases, events are gleaned from log files maintained with resources that process.

The phrase "heterogeneous environments" refers to different processing environments, such as a Virtual Machine or cloud environment versus a legacy enterprise network that utilizes no abstraction but rather utilizes underlying physical devices, servers, databases, etc.

Various embodiments of this invention can be implemented in existing network architectures. For example, in some embodiments, the techniques presented herein are implemented in whole or in part in the Novell® network and proxy server products, operating system products, cloud-based products or services, directory-based products and other products and/or services distributed by Novell®, Inc., of Waltham, Mass.

Also, the techniques presented herein are implemented in machines, such as processor or processor-enabled devices. These machines are configured to specifically perform the processing of the methods and systems presented herein.

Moreover, the methods and systems are implemented, programmed, and reside within a non-transitory and computer-readable or processor-readable storage media and processed on the machines (processing devices) configured to perform the methods.

Of course, the embodiments of the invention can be implemented in a variety of architectural platforms, devices, operating and server systems, and/or applications. Any particular architectural layout or implementation presented herein is provided for purposes of illustration and comprehension only and is not intended to limit aspects of the invention.

It is within this context that embodiments of the invention are now discussed within the context of FIGS. 1-5.

FIG. 1 is a diagram of a method 100 for meta-directory control and evaluation of events, according to an example embodiment. The method 100 (hereinafter "cloud event manager") is implemented in a machine-accessible and computer-readable medium and instructions that execute on one or more processors (machines, computers, processors, etc.). The machines are specifically configured to process the cloud event manager. Furthermore, the cloud event manager is operational over and processes within a network. The network may be wired, wireless, or a combination of wired and wireless.

At 110, the cloud event manager gathers or collects events from resources that are processing in a variety of heterogeneous processing environments. That is, some resources may process in different cloud environments (private and/or public), some resources process in virtualized environments, some resources from specific enterprise physical processing environments and networks.

The resources either produce directory or indicate cause to be produce the events. So, a monitoring agent, logging agent, or other service within the processing environment of a particular heterogeneous environment can detect actions taken by a particular resource and cause an event to be raised. As noted below, the events may also be mined from history or audit logs kept within some or all of the heterogeneous processing environments.

According to an embodiment, at 111, the cloud event manager uses agents executing in each of the one or more heterogeneous environments to mine log or audit files for the events. The agents then assert the events for further processing as noted above.

Continuing with the embodiment, at 111 and at 112, the agents normalize and then publish the events on a communication channel that is monitored by the cloud event manager or other agents of the cloud event manager.

At 120, the cloud event manager organizes the events into one or more taxonomies. That is, each event is assigned to a hierarchical category. Assignment can be based on a type associated with the event, an identity of the heterogeneous environment that the event originates from, an identity of the resource causing the event to be produced, or a various combinations of these things. In addition, policy can be used to assign each event to a particular location within a particular taxonomy. The point of the processing at 120 is to have the cloud event manager organize and in some cases normalize the events according to policy conditions that are evaluated.

Accordingly and in an embodiment, at 121, the cloud event manager normalizes the events into normalized events and then maps each normalized event to a specific location defined in a specific one of the taxonomies.

At 130, the cloud event manager assigns particular events to nodes defined in a directory. Each node represents a relationship between two or more resources. That is, each node in the directory defines a relationship between multiple resources, such as between a router and a server; or, an authentication service and a particular identity store. It is noted that each relationship can be defined via a separate administrative interface to a configuration management database or automatically defined in real time by analysis of events. Each node may be logically viewed as a container, such as a subdirectory for housing the events and other metadata related to the events.

So and in one scenario, at 131, the cloud event manager accesses a configuration management database manager to acquire policies that are evaluated to define an assignment for each event to a particular node in the directory. The evaluation can result in a new node being inserted into the directory as well.

At 140, the cloud event manager evaluates the particular events that are assigned to specific nodes in view of other events for those assigned nodes within the directory. Here, accumulation of specific events or even a single event can according to policy trigger a variety of automated actions.

For example, at 141, the cloud event manager consults a configuration management database manager to acquire policy, which is used to evaluate the particular events in view of the other events. The policy defines threshold values for a density of each node with respect to those events housed under that node and a frequency count for a given type of event occurring over a given time interval. It may be also that the presence of a single event type placed in a particular node triggers some actions from the directory.

In a scenario, at 150, the cloud event manager dynamically and automatically generates a problem ticket that is sent to a support and maintenance resource based on evaluation of the particular events and their particular node assignments within the directory. So, an automated problem scenario with for an enterprise's resources and networks can be dynamically detected in a prophylactic manner and without any manual intervention. In some cases, other automated processed can be triggered by the automatic problem ticket generation to automatically take action to resolve the problem ticket; in such a scenario, no human action is needed at all to detect and resolve problems with resources of a network. It is noted that other metrics beyond just density and frequency can be used advantageously as well and the amount and type of metrics gathered and evaluated can be configured into the processing.

As another example, at 160, the cloud event manager sends a notification for further analysis to be scheduled or logged for particular events. This can be automatically sent to an administrative or analyst resource within the enterprise.

In still another scenario, at 170, the cloud event manager takes one or more automated mitigation actions based on evaluation of the particular events. Again, policies can define the mitigation actions that the cloud event manager is authorized to take in an automated fashion. For example, a specific resource may be automatically cycled or booted to resolve a problem detected with another different resource as detected when evaluating the events in view of policy. For instance, a device of a user may be unable to wireless connect to a wireless router and when evaluating the events and node assignments a policy indicates that the wireless router should be rebooted. This may entail other actions such as sending notices to existing users connected to the wireless router that a reboot is about to occur, and the like.

In another case, at 180, the cloud event manager simultaneously presents in a display the particular events, policy disposition for policy used in evaluating the particular events, and mitigation actions performed as a result of the policy disposition. In other words, the processing, aggregation, and filtering of the events can be visually depicted on a display as well as the policies used, results of policy evaluation, and automated actions taking in response to the policy evaluation. The entire processing of the cloud event manager can be visualized for administrators to watch what is transpiring in their networks and resources.

In an embodiment, at 190, the cloud event manager automatically updates a policy repository and/or schema for the events based on evaluation of the particular events. That is, new relationships between resources as defined in the events may be automatically detected and used to update policies, nodes of the directory, and schemas for the policies and/or directory. This can provide a dynamic and real time feedback loop for the processing at 110-140; so that the cloud event manager is continually learning based on new events and relationships and continually self-updating and self-configuring itself to handle such situations.

Figure 2:
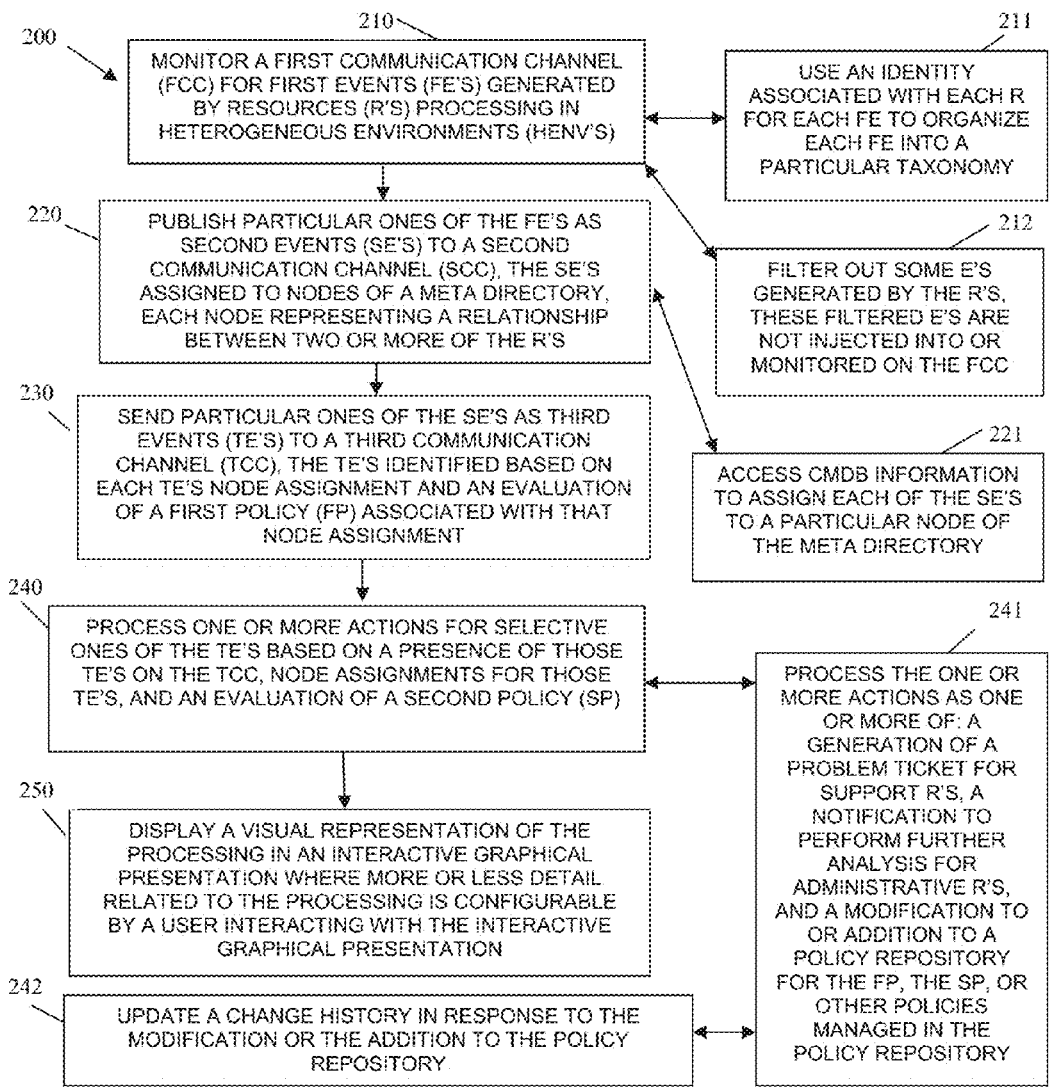
FIG. 2 is a diagram of another method for meta-directory control and evaluation of events, according to an example embodiment.

FIG. 2 is a diagram of another method 200 for meta-directory control and evaluation of events, according to an example embodiment. The method 200 (hereinafter "network event evaluator") is implemented in a machine-accessible and computer-readable storage medium as instructions that execute on one or more processors of a network node. The network event evaluator is operational over a network. The network may be wired, wireless, or a combination of wired and wireless. Furthermore, the processor is specifically configured to process the network event evaluator.

The network event evaluator presents another and in some ways enhanced perspective of the cloud event manager, which was represented by the method 100 of the FIG. 1 above.

At 210, the network event evaluator monitors a first communication channel for first events generated by resources processing in heterogeneous processing environments. The communication channel can be a logical or physical communication bus or a combination of logical and physical. Moreover, in some cases, the communication channel occurs over a predefined port that the network event evaluator is designed to monitor for first events.

According to an embodiment, at 211, the network event evaluator uses an identity associated with each resource for each first event to organize each first element into a particular location of a particular taxonomy. An identity can also be used for the heterogeneous environment and/or for each of the first events themselves. So, a combination of identities is used to recognize the first events and then apply policy and/or linguistic processing to organize each first element into a particular taxonomy.

In another case, at 212, the network event evaluator filters out some of the elements generated by the resources and these filtered events are not injected into or monitored on the first communication channel. That is, not all events are organized into the taxonomies and therefore put on the first communication channel; some events are filtered out based on policy as well.

At 220, the network event evaluator publishes particular ones of the first events as second events to a second communication channel. Again, the second communication channel can be physical, logical, or a combination of both physical and logical. The second events are assigned to nodes a Meta directory where each node of the Meta directory is a subdirectory and that represents and/or defines a particular relationship between two or more of the resources.

According to an embodiment, at 221, the network event evaluator accesses configuration management database information for the Meta directory to assign each of the second events to a particular node (relationship and subdirectory) of the Meta directory.

At 230, the network event evaluator sends particular ones of the second events as third events to a third communication channel. The third events are identified based on: each third event's node assignment and evaluation of a first policy associated with that particular node assignment. Again, this information can be retained with the Meta directory and/or acquired via a configuration management database or a configuration management database manager.

At 240, the network event evaluator processes one or more actions for selective ones of the third events and based on: a presence of those third events on the third communication channel, node assignments for those third events, and an evaluation of a second policy (perhaps acquired from the configuration management database).

In an embodiment, at 241, the network event evaluator can process a number of automated action based on evaluation of the third events. For example, the network event evaluator can process one or more automated actions for: generating a problem ticket for support resources, sending a notification for performing further analysis for administrative resources, and/or making modifications or additions to a policy repository for the first policy, the second policy, and/or other policies managed in the policy repository. It is noted that the policy repository can be noted, referenced, or defined completely within the configuration management database.

Continuing with the embodiment of 241 and at 242, the network event evaluator updates a change history in response to the modification or addition to the policy repository and/or the configuration management database.

In yet another situation, at 250, the network event evaluator displays a visual representation of the processing in an interactive graphical presentation where more or less detail related to the processing of the network event evaluator is configured, by a principal (user or even automated service accessing the presentation), which interacts with the interactive graphical presentation. In other words, fine grain or coarse grain details regarding the complete processing of the network event evaluator can be presented on demand in the interactive graphical presentation and the level of details (finer or coarser) can be custom defined when the principal interacts with the graphical presentation and its elements.

Figure 3:
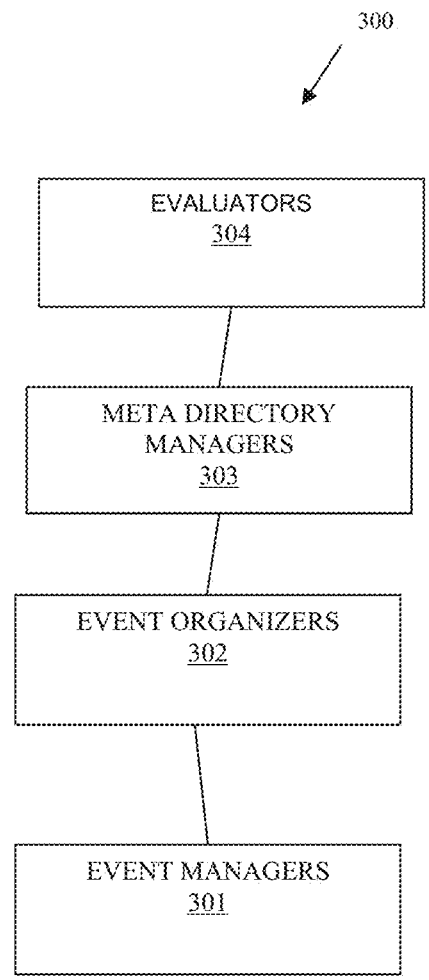
FIG. 3 is a diagram of a meta-directory control and event evaluation system, according to an example embodiment.

FIG. 3 is a diagram of a meta-directory control and event evaluation system 300, according to an example embodiment. The meta-directory control and event evaluation system 300 is implemented and programmed within a non-transitory machine-accessible and computer-readable storage medium as instructions that execute on one or more processors (multiprocessor) and that is operational over a network. The one or more processors are specifically configured to process the components of the meta-directory control and event evaluation system 300. Moreover, the network may be wired, wireless, or a combination of wired and wireless. In an embodiment, the meta-directory control and event evaluation system 300 implements, among other things, certain aspects of the methods 100 and 200 represented by the FIGS. 1 and 2, respectively.

The meta-directory control and event evaluation system 300 includes a plurality of event managers 301, a plurality of event organizers 302, a plurality of Meta directory managers 303, and a plurality of evaluators 304. Each of these and their interactions with one another will now be discussed in turn.

Each event manager 301 is implemented, programmed, and resides within a non-transitory computer-readable storage medium and executes on one or more processors of the network. Example aspects of processing associated with the event managers 301 were discussed above with reference to the FIGS. 1 and 2, respectively. Moreover, more details and examples of the event managers 301 are discussed below with reference to the discussion related to the FIG. 4. Also, each of the processors is configured to specifically process the event managers 301.

Each event manager 301 interacts with one or more event collectors (discussed below with reference to the FIG. 4). The event collectors process within particular processing environments and communicate first events being generated or being caused to be generated by resources that execute in the particular processing environments.

Each event manager 301 is also configured to organize the first events into second events, which are assigned to particular taxonomies. Further, each event manager 301 publishes their second events, assigned to taxonomies and perhaps normalized into an intermediate format, to a first communication channel.

Each event organizer 302 is implemented, programmed, and resides within a non-transitory computer-readable storage medium and executes on one or more processors of the network. Example aspects of processing associated with the event organizer 302 were discussed above with reference to the FIGS. 1 and 2, respectively. Moreover, more details and examples of the event organizers 302 are discussed below with reference to the discussion related to the FIG. 4 (referred to as Event Placement mechanisms in the FIG. 4 below). Also, each of the processors is configured to specifically process the event organizers 302.

Each event organizer 302 is configured to assign the second events detected on the first communication channel as third events to nodes of a Meta directory. Each node defines a relationship between two or more resources and each event organizer 302 also configured to publish the third events on a second communication channel.

Each Meta directory manager 303 is implemented, programmed, and resides within a non-transitory computer-readable storage medium and executes on one or more processors of the network. Example aspects of processing associated with the Meta directory manager 303 were discussed above with reference to the FIGS. 1 and 2, respectively. Moreover, more details and examples of the Meta directory managers 303 are discussed below with reference to the discussion related to the FIG. 4 (referred to as Meta Directory in the FIG. 4 below). Also, each of the processors is configured to specifically process the Meta directory managers 303.

Each Meta directory manager 303 is configured to monitor the second communication channel for the third events and evaluate each third event in view of a first policy to selectively publish some of the third events as fourth events on a third communication channel.

Each evaluator 304 is implemented, programmed, and resides within a non-transitory computer-readable storage medium and executes on one or more processors of the network. Example aspects of processing associated with the evaluators 304 were discussed above with reference to the FIGS. 1 and 2, respectively. Moreover, more details and examples of the evaluators 304 are discussed below with reference to the discussion related to the FIG. 4 (referred to as Evaluator in the FIG. 4 below). Also, each of the processors is configured to specifically process the evaluators 304.

Each evaluator 304 is configured is configured to monitor the third communication channel for the fourth events and evaluate a second policy to take one or more automated processing actions in response to the second policy evaluation and the fourth events.

According to an embodiment, each evaluator 304 is further configured to automatically update information in a configuration management database in response to taking the one or more actions.

Continuing with the previous embodiment, the update information is used to dynamically configure and alter processing associated with: the event managers 301, the event organizers 302, the Meta directory managers 303, and the evaluators 304. The updated information creates a dynamic feedback loop for the system 300.

Figure 4:
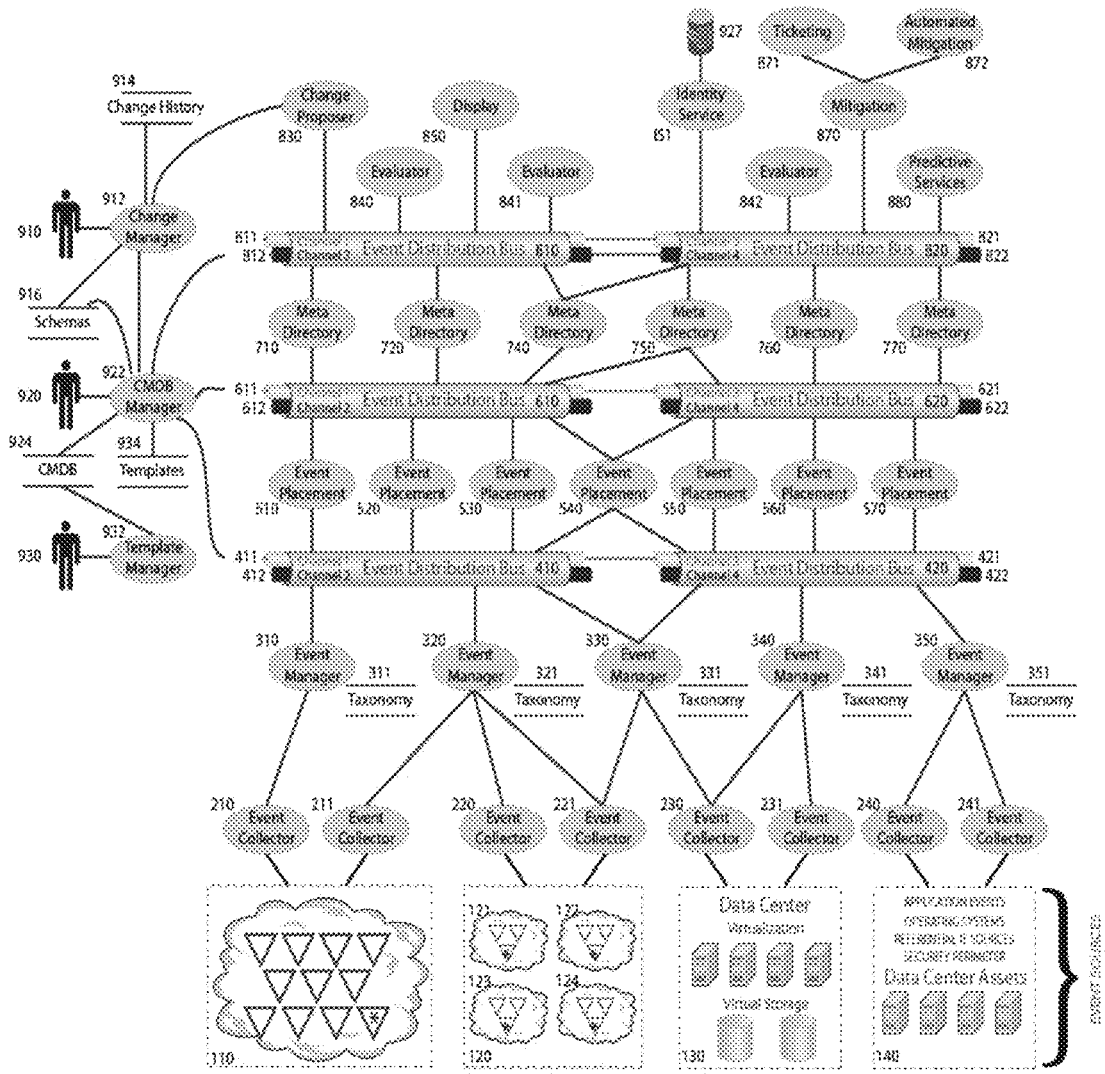
FIG. 4 is a diagram of a system architecture that uses the techniques presented herein.

FIG. 4 is a diagram of a system architecture that uses the techniques presented herein. The components of the FIG. 4 are implemented and programmed within a non-transitory computer-readable or processor-readable storage medium and execute on one or more processors specifically configured to perform the techniques discussed herein and below.

It is common for a well-run enterprise to have a Configuration Management Database (CMDB) or its equivalent to document the physical, logical, and configuration details of the data center and associated infrastructure (e.g., routers, switches, etc. to provide network access from employee offices or via wireless access). These systems typically hold static information about these devices and their associations; however, these existing configuration management systems fall short while trying to capture, store, and process dynamic information such as events, log records, and ephemeral or temporary bindings and associations. The embodiments discussed herein teach mechanisms for solving these problems in ever increasing and dynamically evolving situations.

The entry of information in a CMDB is augmented by mechanisms that allow an administrator, at 910, to enter or select parts of a hard- or soft-infrastructure to document relationships. These relationships are captured by entering them as nodes in a meta-directory or database. For example, a new power conditioner is connected to a distribution panel. The addition of the new device and its configuration is entered into the CMDB, at 924, via 922 and, according to the techniques discussed herein, is associated in the meta-directory or database with the distribution panel as input and a segment of the data center power grid as output.

Also noted in the CMDB 914, is the location/source of log information and/or event mechanisms (e.g., pager, Short Message Service (SMS), Java Message Service (JMS), etc.) that provide diagnostic and operational information concerning the power conditioning device that is generated by the device or specific monitoring mechanisms associated with the device located in the Event Sources layer of the diagram in the FIG. 4 including 110, 120, 130, and 140 (note that this information may diverge dramatically from the configurations of other, older, power conditioning devices in use by the enterprise). While the information from such a device comes from 140, the techniques herein also provide for the gathering and evaluation of log information and/or events from infrastructure and services in a virtualized environment, at 130, a private cloud environment, at 120, and/or a public cloud environment, at 110. In an embodiment, the inverted triangles in 120 and 110 indicate elements of a cloud or virtualized environment, which are specific to monitoring aspects of infrastructure specific to a virtualized environment. The techniques herein allow for, but do not require, pre-processing of the data by the Event Collectors (210-241) or the Event Managers (310-350).

In an embodiment, the smaller clouds at 121, 122, 123, and 124 in 120 represent cloud-like environments that may exist on single desk-top type devices, which have been configured with cloud-like environments to partition the processing and storage of the desk-top type device so that specific policy and operational characteristics can be enforced. For example, a telecommuting employee may own an 8-core desk-top with adequate memory, storage, network, etc. that has a cloud environment instantiated so that the enterprise that the employee works for may enforce the policies and operational characteristics required by the employer concerning the subject matter of the work. The configuration of such an environment can also be defined and contained in the CMDB, at 924. The following description continues to reference a device, but it is understood that the device could refer to devices (plural), infrastructure, services, hyper-visors, networks, routers, cloud environments, virtualized environments, etc.

During the entry of this information and the placement of the device in relation to other infrastructure, templates describing the information provided by the device are selected (preexisting), added (provided by the device manufacturer), or entered (developed and entered by the administrator) so that pertinent information is properly identified (e.g., serial number, model number, event identifier, error number, etc). If needed, the schema of the meta-directory or database is modified to include the template(s), indexes are identified (as a part of the template in one embodiment), and nodes created to contain instances of log records or events produced during the operation of the device or service. The nodes are located in the meta-directory or database so that the position in the hierarchy is indicative of relationship (e.g., the aforementioned power conditioner placed between the power panel and the data center power grid).

It is well to note that use of the techniques herein provide the enterprise Information Technology (IT) staff with operational information that will help the staff to fine tune the CMDB and, therefore, the schemas of the meta-directory or database. In addition, the techniques herein allow the enterprise IT staff access to the operational tools of the meta-directory or database to view and process event, log, and association information without any further development or programming required.

The end result, then, is that events and log-file records are produced by devices, services, storage, etc. from a traditional data center environment, at 140. Also, events and log-file records are produced by devices, services, hypervisors, processing abstractions, I/O abstractions, storage abstractions, storage, etc. at 130. Also, events and log-file records are produced by devices, services, hypervisors, processing abstractions, I/O abstractions, storage abstractions, storage, specialized cloud management services, specialized cloud management Application Programming Interfaces (APIs), and enterprise policy services, etc. in 120. Also, events and log-file records are produced by devices, services, hypervisors, processing abstractions, I/O abstractions, storage abstractions, storage, cloud management services, cloud management APIs, multi- and single-tenant control services, etc. in 110.

These events and log-file records are collected by Event Collectors 210-241 using whatever collection means are specific to the device, service, hypervisor, etc. that is being monitored. Event Collectors can be active (i.e., they are polling and crawling and searching for new event information) or passive (i.e., they are listening and monitoring active event sources).

The Event Collectors 210-241 forward collected monitor information to associated Event Managers 310, 320, 330, 340, and 350 each of which apply taxonomy rules specific to the Event Manager, e.g., 310 using 311, 320 using 321, etc. The purpose of this layer of processing is for the Event Manager to provide only events and log-records that are identified as "pertinent." These pertinent events and log-records are also organized according to the associated taxonomy (e.g., as eXtensible Markup Language (XML) files). Finally, the results are published into an appropriate Event Distribution Bus at 410 and/or 420 using an appropriate channel, such as 411, 412, 421, and 422.

It is well to note at this point that though the FIG. 4 shows a specific number and configuration of Event Collectors, Event Managers, etc. the actual number of such can be different in each instantiation of an embodiment of the invention. Also, some mechanisms are shown directly communicating with other mechanisms (e.g., 210 to 310; 211, 220, 221 to 320, etc.) the actual interconnects and methods of connection may be mixed and matched between such mechanisms as direct, multi-cast, event bus, etc. The FIG. 4 shows one embodiment of a collection of direct connections and bus connections. The embodiments of invention are not, however, limited by the example depiction presented with the FIG. 4.

It is to be understood at this point that each bus, channel, process, etc. may have an identity produced via an Identity Service (IS1).

The Event Manager(s) publish the processed events either directly to an Event Placement mechanism (510-570) or on an Event Distribution Bus. In an embodiment a specific channel is used for specific Event Placement mechanism(s), in another embodiment the identity or metadata associated with the posting is filtered by the Event Placement mechanisms. The Event Placement mechanisms process the events according to CMDB information communicated, via 922, such that the event is associated with a template and a node location in the meta-directory or database. In any event, the final disposition is communicated via 610-622 and the Meta-Directory 710-770 inserts the event into the meta-directory or database. The advantage of placing information into the meta-directory or database is the consistency and interoperability that such system provide. Meta-directory and database systems have well proven data management and data protection features such as schema validation, schema extension, import, export, merge, join, split, repair, caching, replication, etc.

The node population density is monitored by the Meta-Directory or database 710-770 according to policy specified by 922 and, if policy dictates, events are published on the Event Distribution Bus 810-822 (remember that the use of direct connect, multi-cast, JMS-type bus, etc. are all include as acceptable implementations of the Event Distribution Bus). In some cases, a single event can cause an event to be published on 810-822, in other cases a specification of a certain number of events over a given time interval will, etc.

The evaluator 840-842 evaluates the events from 810-821 and applies policy for notification and/or mitigation. If mitigation then 870 receives the event, which will cause mitigation policy (provided by 922) to be instigated. In an embodiment this involves Ticketing 871 and/or Automated Mitigation 872.

In an embodiment, a Display mechanism 850 is used to display events, policy disposition, mitigation actions, etc.

In an embodiment the events from 810-822 are monitored along with actions from 840-880, which causes changes to the schema(s) and/or policies to be proposed to 912. 912 via 910 may make a schema change which causes 922 to be reviewed by 920 to keep the actions of the invention correct. A change history is maintained at 914.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method, comprising:
    gathering events for disparate processing environments over a network connection, wherein resources processing in the disparate processing environments cause the events to be produced;
    organizing the events into categories, wherein organizing further includes assigning each event to a particular one of the categories based on a combination of a processing environment type from a particular one of the disparate processing environments where that event originated and a resource identity for a particular one of the resources causing that event to be produced; and
    processing an action in response to at least a portion of the organized events, wherein processing further includes processing the action as one or more of: generating a problem ticket, sending a notification for further analysis, making modifications to a policy with respect to the disparate processing environments or the resources, and adding a new policy with respect to the disparate processing environments of the resources.

2. The method of claim 1 wherein gathering further includes identifying a number of the processing environments as being heterogeneous processing environments to one another.

3. The method of claim 1, wherein gathering further includes identifying each event with a particular resource from one of the disparate processing environments.

4. The method of claim 1, wherein gathering further includes receiving each of the events from agents that execute within the processing environments, the agents sending the events when the resources within the processing environments take some processing action.

5. The method of claim 1, wherein gathering further includes mining at least some of the events from at least some of the processing environments.

6. The method of claim 5, wherein mining further includes obtaining the at least some of the events from one or more of:
    history logs and audit logs from the at least some of the processing environments.

7. The method of claim 1, wherein organizing further includes organizing the events into one or more taxonomies from the categories.

8. The method of claim 1, wherein organizing further includes organizing the events further based on one or more of:
    types assigned to the events, identities for the processing environments, and resource identities for the resources that cause to produce or produce the events within the processing environments.

9. The method of claim 1, wherein organizing further includes assigning particular organized events to relationships between the resources that cause to produce or produce the events within the processing environments.

10. The method of claim 1, wherein processing further includes selecting the action for processing from a list of available actions based on a particular relationship.

11. The method of claim 1, wherein processing further includes assigning the action to a node of the network for performing the processing.

12. A method, comprising:
    organizing events collected from disparate processing environments into categories, wherein organizing further includes capturing the events that are produced by resources processing within the disparate processing environments;
    deriving relationships between the resources based on the categories for the events; and
    causing at least one automated action to be processed based at least in part on a particular organized event assigned to a particular category and a particular relationship, wherein causing further includes causing the automated action to one or more of: generating a problem ticket, sending a notification for further analysis, making modifications to a policy with respect to the disparate processing environments or the resources, and adding a new policy with respect to the disparate processing environments of the resources.

13. The method of claim 12, wherein organizing further includes selectively publishing some of the organized events over specific communication channels of a network.

14. The method of claim 12, wherein organizing further includes normalizing the organized events.

15. The method of claim 12, wherein organizing further includes selectively publishing some of the organized events based on evaluation of policy conditions.

16. The method of claim 12, further comprising, displaying the organized events, the categories, the relationships, and the at least one action and other actions.

17. The method of claim 12 further comprising, monitoring the organized events and the at least one action and when the at least one action is processed updating one or more of: the policy and a schema.

18. A system, comprising:
    distributed event managers, each event manager implemented as executable instructions residing in a non-transitory computer-readable storage medium and executed on one or more processors of one of a plurality of processing environments; and
    an evaluator implemented as executable instructions residing in a non-transitory computer-readable storage medium and executed on one or more processors of a cloud server; wherein the distributed event managers are configured to report events to the evaluator, the events obtained from the processing environments in response to actions of resources within those processing environments that cause the events to be produced during the processing of the resources within the plurality of processing environments, and wherein the evaluator is configured to:
organize the events into categories, establishing relationships between the resources based on the categories, and cause automated actions to be processed in response to the events organized into the categories and the established relationships for the events, and cause the automated actions to one or more of: generate a problem ticket, send a notification for further analysis, make modifications to a policy with respect to the plurality of processing environments or the resources, and add a new policy with respect to the plurality of processing environments of the resources.

19. The system of claim 18, wherein the event managers are further configured to communicate the events over predefined communication channels of a network.

20. The system of claim 18, wherein the event managers are further configured to mine logs within the processing environments in which the event managers execute for at least some of the events.

* * * * *